US009698649B2

(12) United States Patent
Cemke et al.

(10) Patent No.: US 9,698,649 B2
(45) Date of Patent: Jul. 4, 2017

(54) ELECTRICAL MACHINES AND METHODS OF ASSEMBLING THE SAME

(75) Inventors: Lisa Cemke, Schofield, WI (US); Robert L. Brandemuehl, Waukesha, WI (US); Sam D. Finocchio, Loves Park, IL (US); Christopher Ohrmundt, Wausau, WI (US)

(73) Assignee: Regal Beloit America, Inc., Beloit, WI (US)

( * ) Notice: Subject to any disclaimer, the term of this patent is extended or adjusted under 35 U.S.C. 154(b) by 679 days.

(21) Appl. No.: 13/558,106

(22) Filed: Jul. 25, 2012

(65) Prior Publication Data
US 2014/0028136 A1 Jan. 30, 2014

(51) Int. Cl.
| H05K 7/00 | (2006.01) |
| H02K 5/26 | (2006.01) |
| H02K 7/14 | (2006.01) |
| H02K 7/00 | (2006.01) |

(52) U.S. Cl.
CPC ............. *H02K 5/26* (2013.01); *H02K 7/003* (2013.01); *H02K 7/14* (2013.01); *Y10T 29/49009* (2015.01); *Y10T 403/64* (2015.01)

(58) Field of Classification Search
CPC  H02K 7/003; H02K 5/26; H02K 7/14; H02K 9/19; F16D 2300/06; F01M 9/108
USPC ...................................................... 310/91, 89
See application file for complete search history.

(56) References Cited

U.S. PATENT DOCUMENTS

| 2,694,157 | A | * | 11/1954 | Cone | ..................... F04D 29/584 |
| | | | | | 310/58 |
| 4,185,514 | A | * | 1/1980 | Edwards | .................. F16H 1/16 |
| | | | | | 74/421 A |
| 4,641,547 | A | * | 2/1987 | Stich | ..................... F16H 57/025 |
| | | | | | 74/606 R |
| 4,824,334 | A | | 4/1989 | Ramsay | |
| 5,344,291 | A | | 9/1994 | Antkowiak | |
| 5,540,563 | A | * | 7/1996 | Hansell | ................. F04B 1/2064 |
| | | | | | 417/239 |
| 5,553,966 | A | | 9/1996 | Morelli et al. | |
| 5,566,591 | A | * | 10/1996 | Burkett | ................. B62K 13/04 |
| | | | | | 403/3 |
| 5,688,070 | A | | 11/1997 | Morelli et al. | |

(Continued)

OTHER PUBLICATIONS

European Extended Search Report for related Application No. 13178025.6-1954/2690759, dated Mar. 11, 2016. 7 Pages.

*Primary Examiner* — Hanh Nguyen
*Assistant Examiner* — Leda Pham
(74) *Attorney, Agent, or Firm* — Armstrong Teasdale LLP (57) ABSTRACT

A motor component for coupling a motor to a work component is provided. The motor component includes a flange coupled to the motor; and an adapter coupled to the flange. The adapter includes a shaft aperture and a pattern of a plurality of through-holes disposed about the shaft aperture and configured to couple to a plurality of pads of the work component. A method of assembling an electrical machine to a work component includes coupling a motor component to a motor of the electrical machine. The method further includes aligning a pattern of a plurality of through-holes of the motor with at least one pad of a plurality of pads of the work component. The method includes coupling the pattern of the plurality of through-holes to the at least one pad of the plurality of pads of the work component.

15 Claims, 9 Drawing Sheets

(56) References Cited

U.S. PATENT DOCUMENTS

| | | | | |
|---|---|---|---|---|
| 5,934,156 A | * | 8/1999 | Phillips | F16H 57/025 |
| | | | | 403/260 |
| 7,806,673 B2 | | 10/2010 | Muscarella et al. | |
| 7,839,037 B2 | * | 11/2010 | Oberle | H02K 7/1166 |
| | | | | 310/154.08 |
| 8,197,554 B2 | | 6/2012 | Whiteley et al. | |
| 9,257,884 B2 | * | 2/2016 | Barton | H02K 5/20 |
| 2007/0154256 A1 | * | 7/2007 | Finocchio | F16H 57/0497 |
| | | | | 403/298 |
| 2009/0028730 A1 | * | 1/2009 | Radermacher | F04D 29/4206 |
| | | | | 417/423.8 |

* cited by examiner

ELECTRICAL MACHINES AND METHODS OF ASSEMBLING THE SAME

BACKGROUND OF THE INVENTION

The embodiments described herein relate generally to electrical machines, and more particularly, to methods and systems for coupling the electrical machine to a plurality of work components.

Certain electrical machines are sometimes referred to as brushless motors. Brushless motors include both brushless AC motors and brushless DC motors and are used in a wide variety of systems operating in a wide variety of industries. Conventionally, brushless motors are coupled to a work component, such as a pump. Some known applications may require a plurality of pumps wherein different pumps may include different shapes and sizes. Each configuration of the pumps may require a respectively shaped and sized motor.

In some applications, a housed coupling, such as a lovejoy coupling, may be needed to couple the motor to the pump. A lovejoy coupling, however, can increase the distance between the motor and the pump which may lead to space constraints. Further, lovejoy couplings can include multiple bushings and couplers which may lead to increased component and maintenance costs. Moreover, because of the respective interconnections between the motor and pump, interchangeability of motors and/or pumps may become difficult which may lead to costly and/or inefficient field modification and/or replacement of the motor or pump. For example, a drop-in replacement motor for various pump applications may require shipping multiple motors to replace an existing motor. Accordingly, a motor distributor may be required to stock a variety of motors to facilitate matching various styles and sizes of pumps or customers may also be required to order specific motors for every existing pump configuration.

Moreover, in some motor applications, fretting may occur in the motor shaft and/or pump shaft. Fretting may refer to wear and sometimes corrosion damage at the asperities of contact surfaces. Often, damage can be induced under load and in the presence of repeated relative motion, as induced, for example, by rotating motor and pump shafts. Conventionally, to replace damaged shafts, the entire motor may be removed from the field and the complete rotor assembly is often replaced which may lead to costly repairs and downtime for the industry application.

BRIEF DESCRIPTION OF THE INVENTION

In one aspect, a motor component for coupling a motor to a work component is provided. The motor component includes a flange coupled to the motor and an adapter coupled to the flange. The adapter includes a shaft aperture and a pattern of a plurality of through-holes disposed about the shaft aperture and configured to couple to a plurality of pads of the work component.

In another aspect, an electrical machine for coupling to a work component is provided. The electrical machine includes a motor comprising a stator having a longitudinal axis, a rotor coupled to the stator and a motor shaft coupled to the rotor along the longitudinal axis. A housing is coupled to and enclosing the motor. The electrical machine includes a flange coupled to the housing and an adapter coupled to the flange. The adapter includes a shaft aperture coupled to the motor shaft and a pattern of a plurality of through-holes disposed about the shaft aperture which are configured to couple to a plurality of pads of the work component. The electrical machine includes a shaft adapter coupled to the motor shaft and to the adapter.

In yet another aspect, a method of assembling an electrical machine to work component is provided. The method includes coupling a motor component to a motor of the electrical machine. The method further includes aligning a pattern of a plurality of through-holes of the motor with at least one pad of a plurality of pads of the work component. The method includes coupling the pattern of the plurality of through-holes to the at least one pad of the plurality of pads.

DETAILED DESCRIPTION OF THE INVENTION

The embodiments described herein relate to electrical machines and methods of assembling the electrical machines. More particularly, the embodiments relate to a component that is configured to facilitate universal coupling of motors with a variety of work components. More particularly, the embodiments relate to coupling a motor to various pump pads and to various pump shafts. It should be understood that the embodiments described herein for electrical machines are not limited to motors, and further understood that the descriptions and figures that utilize a motor and a pump are exemplary only. Moreover, while the embodiments illustrate a three phase electric motor, the embodiments described herein may be included within motors having any number of phases, including single phase and multiple phase electric motors.

Figure 1:
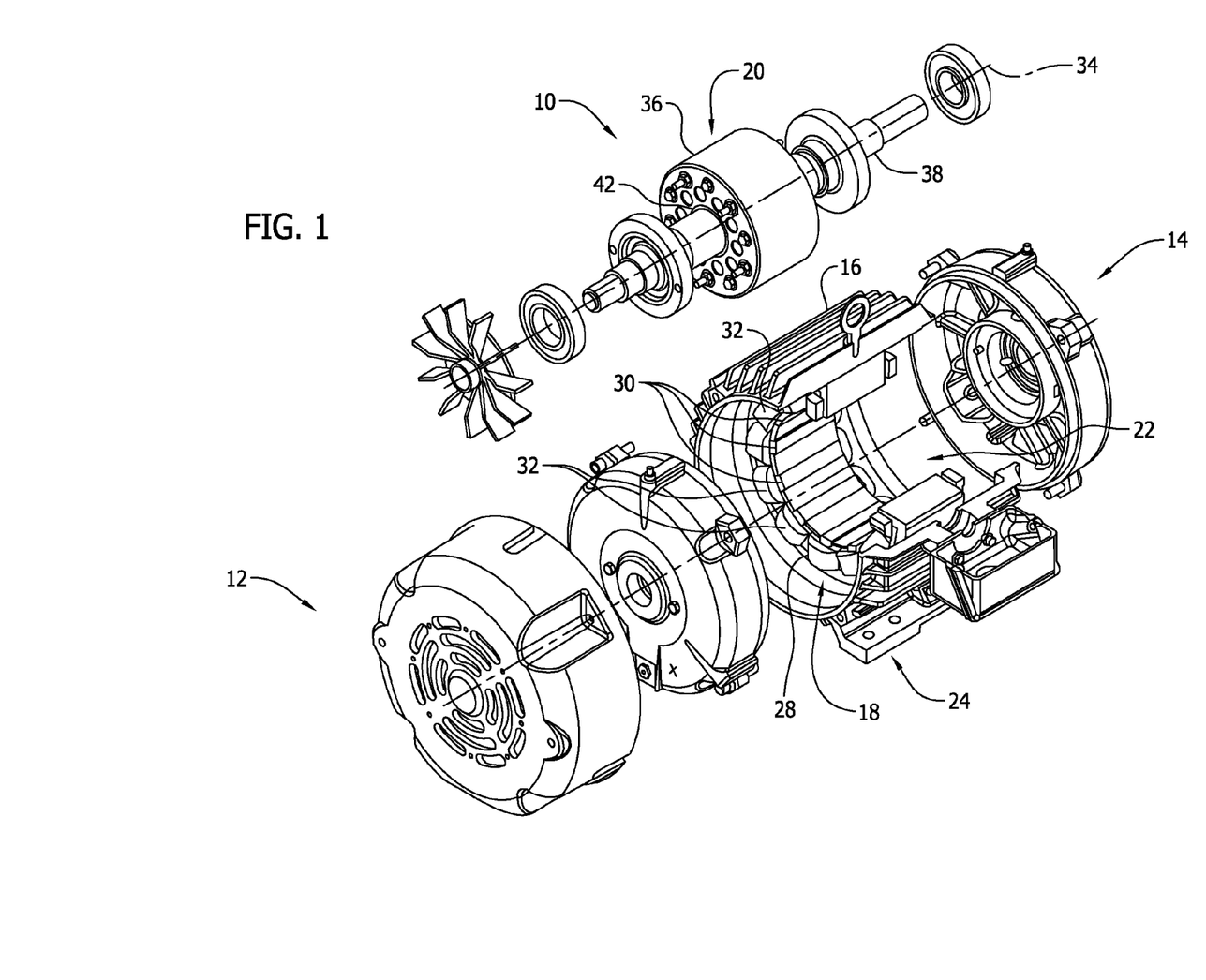
FIG. 1 is an exploded cutaway view of an exemplary electric motor.

FIG. 1 is an exploded cutaway view of an exemplary electrical machine 10 that can be operated as either a generator or a motor. Electric motor 10 includes a first end 12 and a second end 14. Electric motor 10 further includes a motor assembly housing 16, a stationary assembly 18, and a rotatable assembly 20. Motor assembly housing 16 defines an interior 22 and an exterior 24 of motor 10 and is configured to at least partially enclose and protect stationary assembly 18 and rotatable assembly 20. Stationary assembly 18 includes a stator core 28, which includes a plurality of stator teeth 30 and a plurality of winding stages 32 wound around stator teeth 30 and adapted to be electronically energized to generate an electromagnetic field. In the exemplary embodiment, a variable frequency drive (not shown) provides a signal, for example, a pulse width modulated (PWM) signal, to electric motor 10. In an alternative embodiment, electric motor 10 may include a controller (not shown) coupled to winding stages 32 and configured to apply a voltage to one or more of winding stages 32 at a time for commutating winding stages 32 in a preselected sequence to rotate rotatable assembly 20 about an axis of rotation 34.

In an exemplary embodiment, stationary assembly 18 is a three phase concentrated wound stator assembly and stator core 28 is formed from a stack of laminations (not shown) made of a magnetically permeable material. While stationary assembly 18 is illustrated for purposes of disclosure, it is contemplated that other stationary assemblies of various other constructions having different shapes and with different numbers of teeth may be utilized.

Rotatable assembly 20 includes a permanent magnet rotor core 36 and a shaft 38. Rotatable assembly 20 may also be referred to as an interior permanent magnet rotor. Examples of motors 10 that may include interior permanent magnet rotors include, but are not limited to, electronically commutated motors (ECMs). ECMs may include, but are not limited to, brushless direct current (BLDC) motors, brushless alternating current (BLAC) motors, and synchronous reluctance motors.

In the exemplary embodiment, rotor core 36 is formed from a stack of laminations (not shown) made of a magnetically permeable material and is substantially received in a central bore of stator core 28. Rotor core 36 includes a shaft opening 42 having a diameter corresponding to a diameter of shaft 38. Rotor core 36 and shaft 38 are concentric and configured to rotate about axis of rotation 34. Rotor core 36 and stator core 28 are illustrated as being solid in FIG. 1 for simplicity, their construction being well known to those of ordinary skill in the art. For example, rotor core 36 may be formed using a sintering process from a soft magnetic composite (SMC) material, a soft magnetic alloy (SMA) material, and/or a powdered ferrite material.

Winding stages 32 are commutated without brushes by sensing the rotational position of rotatable assembly 20 as it rotates within stator core 28 and utilizing electrical signals generated as a function of the rotational position of rotatable assembly 20 sequentially to apply a voltage to each of winding stages 32 in different preselected orders or sequences that determine the direction of the rotation of rotatable assembly 20. Position sensing may be accomplished by a position-detecting circuit (not shown) responsive to the back electromotive force (EMF) to provide a simulated signal indicative of the rotational position of rotatable assembly 20 to control the timed sequential application of voltage to winding stages 32 of stationary assembly 18. Other means of position sensing may also be used.

Figure 2:
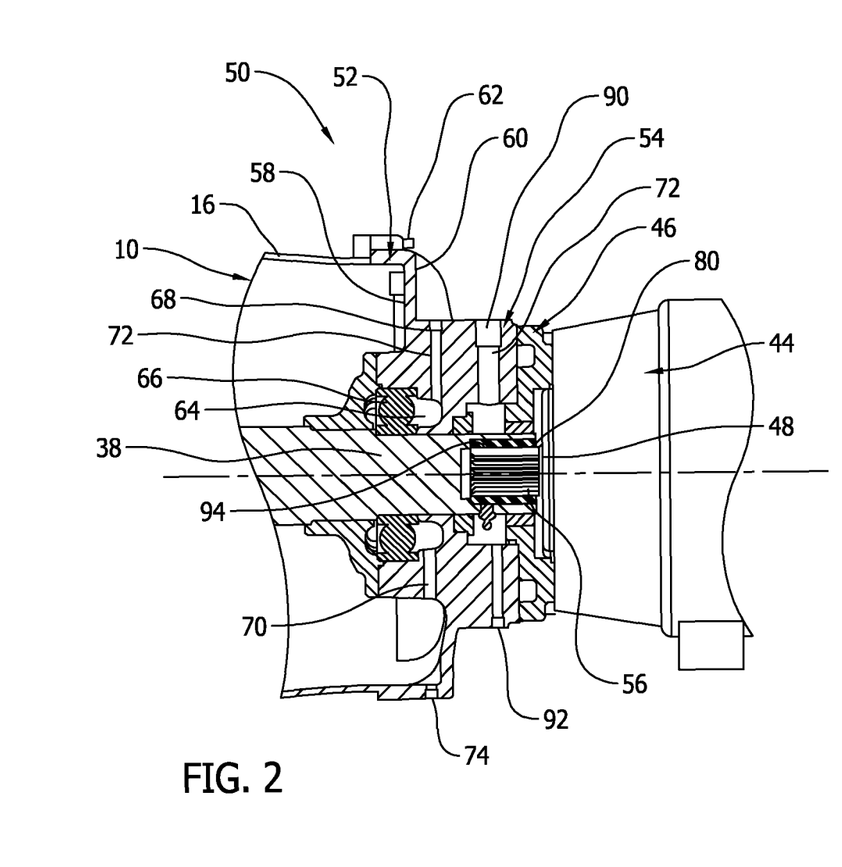
FIG. 2 is a partial side, side cross-sectional view of the electric motor shown in FIG. 1 coupled to a work component.

FIG. 2 illustrates a partial, cross sectional view of motor 10 coupled to a work component 44 included within a commercial and/or industrial application. Work component 44 may include, but is not limited to, a pump system, an air handling unit, and/or manufacturing machinery (e.g., conveyors and/or presses). In such applications, motor 10 may be rated at, for example only, three horsepower (hp) to sixty hp. In the exemplary embodiment, work component 44 includes a pump. Alternatively, work component 44 may include a fan for moving air through an air handling system, for blowing air over cooling coils, and/or for driving a compressor within an air conditioning/refrigeration system. Although described herein using the above examples, electric motor 10 may engage any suitable pump 44 and be configured to drive such pump 44. Pump 44 includes a pad 46 and a pump shaft 48. In the exemplary embodiment, pad 46 is configured to couple to pump 44 and to motor 10 and pump shaft 48 is configured to couple to motor shaft 38.

Electrical motor 10 includes a motor component 50 that is coupled to housing 16, wherein motor component 50 includes a flange 52, an adapter 54, and a shaft adapter 56. Motor component 50 is configured to couple motor 10 to a plurality of pumps 44 to facilitate adaptability of motor 10 to different types and sizes of pumps 44. Moreover, motor component 50 is configured to facilitate decreasing a distance between motor 10 and pump 44. In the exemplary embodiment, flange 52 is integrally coupled to adapter 54. More particularly, flange 52 and adapter 54 include a one-piece solid casting. Alternatively, flange 52 and adapter 54 may be separate components and coupled together via a fastener (not shown) such as, but not limited to, a bolt, a clamp, and a weld. Any configuration of flange 52 and/or adapter 54 may be used to enable motor component 50 to function as described herein.

Flange 52 includes a first side 58 and a second side 60 wherein first side 58 is configured to couple to housing 16 and second side 60 is orientated toward adapter 54. In the exemplary embodiment, a fastener 62, for example a bolt, is configured to couple flange 52 to housing 16. Alternatively, fastener 62 may include any fastening mechanism that is configured to couple flange 52 to motor housing 16. Flange 52 defines an interior 64 that is sized and shaped to receive a bearing 66. Moreover, flange 52 includes a fluid inlet 68 and a fluid outlet 70 that are coupled in flow communication to bearing 66. Fluid inlet 68 is configured to channel fluid 72, such as but not limited to grease, into bearing 66, and fluid outlet 70 is configured to discharge fluid 72 out of bearing 66. Moreover, flange 52 includes another fluid outlet 74, such as, for example, a condensation drain that is coupled in flow communication to interior 64 and configured to channel any fluid (not shown) out of interior 64.

In the exemplary embodiment, adapter 54 is configured to couple to pad 46 of pump 44. Adapter 54 includes a shaft aperture 80 and a fluid inlet 90 and a fluid outlet 92 coupled in flow communication with shaft aperture 80. Shaft aperture 80 is configured to receive motor shaft 38 for rotation therein. Fluid inlet 90 is configured to channel fluid 72 such as, for example, grease, toward motor shaft 38 and fluid 72 is discharged out of second portion 78 through outlet 92.

In the exemplary embodiment, shaft adapter 56 is coupled to motor shaft 38 and to pump shaft 48. Shaft adapter 56 is configured to couple motor shaft 38 to a plurality of pump shafts 48 to facilitate universal coupling of motor shaft 38 to different types and sizes of pump shafts 48. In the exemplary embodiment, shaft adapter 56 is coupled to a bore 94 of motor shaft 38. Alternatively, shaft adapter 56 can couple to any surface of motor shaft 38. Shaft adapter 56 can couple to motor shaft 38 in any manner to enable motor component 50 to function as described herein.

Figure 3:
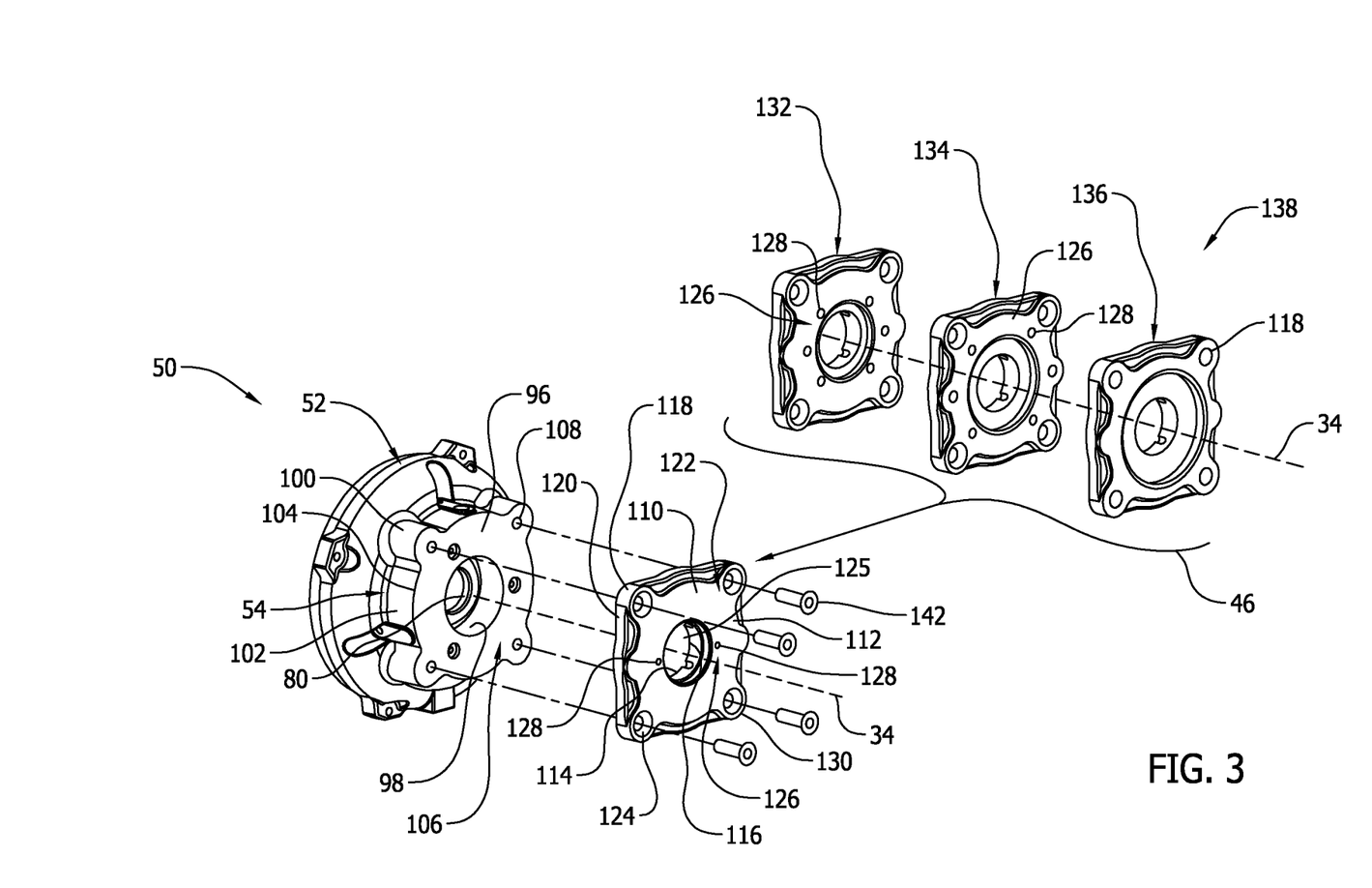
FIG. 3 is a perspective view of a motor component of the motor shown in FIG. 2 and a plurality of pads of the work component shown in FIG. 2.

FIG. 3 is a perspective view of motor component 50 shown in FIG. 2 and a plurality of pads 46. In the exemplary embodiment, adapter 54 is sized, shaped, and orientated to couple to each pad 46. Adapter 54 includes a receiving area 96 having a adapter aperture 98 that is configured to couple to pad 46. In the exemplary embodiment, adapter aperture 98 includes a different sized diameter than a diameter of shaft aperture 80. More particularly, adapter aperture 98 has a larger diameter than shaft aperture 80 to facilitate coupling adapter 54 to pad 46. Alternatively, adapter aperture 98 can have a substantially same size diameter or smaller diameter than shaft aperture 80. Adapter aperture 98 can include any size diameter that enables adapter 54 to function as described herein.

Receiving area 96 includes a plurality of corners 100 and a plurality of sides 102. Corners 100 and sides 102 are sized and shaped to facilitate matching sizes and shapes of pads 46. In the exemplary embodiment, receiving area 96 includes four corners 100 and four sides 102. Alternatively, receiving area 96 may include more than four corners 100 and four sides 102 or less than four corners 100 and four sides 102. Receiving area 96 may include any number of corners 100 and sides 102 to enable adapter 54 to function as described herein. Corners 100 include a curvilinear shape which is configured to facilitate alignment with pad 46 while providing strength to adapter 54. Alternatively, each corner 100 may include other shapes such as, for example, polygon shapes. Corner 100 can include any shape that enables adapter 54 to function as described herein.

In the exemplary embodiment, each side 102 is curvilinear shaped. More particularly, each side 102 includes a convex portion 104 with respect to adapter aperture 98. In the exemplary embodiment, convex portion 104 does not extend beyond corners 100 to facilitate aligning adapter 54 with pads 46 while reducing material cost for adapter 54. Alternatively, sides 102 can include other shapes such as, but not limited to, non-curvilinear shapes. Sides 102 can include any shape that enables adapter 54 to function as described herein.

Receiving area 96 includes a pattern 106 of a plurality of through-holes 108 disposed around shaft aperture 80. Moreover, in the exemplary embodiment, pattern 106 is disposed around adapter aperture 98. Through-holes 108 are sized, shaped and oriented within receiving area 96 to facilitate coupling adapter 54 to the plurality of pads 46. More particularly, pattern 106 is configured to facilitate universitality of coupling motor 10 (shown in FIG. 2) to a plurality of pumps 44 (shown in FIG. 2) via coupling to different pads 46 associated with each pump 44. In the exemplary embodiment, each corner 100 is configured to receive at least one through-hole 108 and each through-hole 108 is configured to receive a fastener 142 which is configured to couple pad 46 to adapter 54.

Pad 46 includes a first side 110 and a second side 112, wherein first side 110 is orientated toward motor component 50 and second side 112 is orientated toward pump 44 (shown in FIG. 2). First side 110 includes a pad extension 114 that is sized and shaped to couple to adapter aperture 98. Pad extension 114 includes an aperture 116 which is configured to align with shaft aperture 80 when pad extension 114 is coupled to adapter 54. Pad 46 includes a plurality of corners 118 and a plurality of sides 120. In the exemplary embodiment, pad 46 includes four corners 118 and four sides 120. Alternatively, pad 46 may include more than four corners 118 and four sides 120 or less than four corners 118 and four sides 120. Moreover, pad 46 includes a pattern 122 of a plurality of through-holes 124 disposed about a pad aperture 116. Through-holes 124 are sized, shaped, and orientated within pad 46 to facilitate coupling to adapter 54. More particularly, through-holes 124 are configured to receive fasteners 142.

In the exemplary embodiment, fastener 142 is configured to couple at least one through-hole 108 of adapter to at least one through-hole 124 of pad 46. In an embodiment, four fasteners 142 are configured to couple four through-holes 108 at corners 100 to four through-holes 127 at corners 118 for a four fastener connection. Alternatively, two fasteners 142 can couple two through-holes 108 at a pair of corners 100 to two through-holes 127 at a pair of corners 118 for a two fastener connection. In the exemplary embodiment, a number of through-holes 108 matches a number of through-holes 124. Alternatively, the number of through-holes 108 may be more than or less than the number of through-holes 124. Fastener 142 can couple a lesser or greater number of through-holes 108 to a number of through-holes 124. Alternatively, fastener 142 can couple a lesser or greater number of through-holes 124 to a number of through-holes 108. Fastener 142 can couple any number of through-holes 108 to any number of through-holes 124.

Second side 112 includes a pattern 126 of a plurality of through-holes 128 that is configured to couple to pump 44 via fasteners (not shown). Pattern 126 is sized and orientated within second side 112 to match a corresponding pattern (not shown) on pump 44 (shown in FIG. 2). More particularly, pattern 126 is configured to designate particular parameters of pump 44 such as, for example, pump type, pump size, pump shape and pump orientation.

The plurality of pads 46 includes a first pad 130, a second pad 132, a third pad 134, and a fourth pad 136. In the exemplary embodiment, pads 130, 132, 134 and 136 are designated as Society of Automotive Engineers (SAE) pads. More particularly, first pad 130 includes a size and shape relating to an SAE "A" pad; and second pad 132 includes a size and shape related to an SAE "B" pad. Third pad 134 includes a size and shape relating to an SAE "C" pad and fourth pad 136 includes a size and shape relating to an SAE "D" pad. Alternatively, pads 130, 132, 134 and 136 may include sizes and shapes for other SAE designations such as, but not limited to, an SAE "E" pad and an SAE "F" pad. Pads 130, 132, 134 and 136 may include any shape and size to enable pump 44 to function as described herein.

In the exemplary embodiment, pads 130, 132, 134 and 136 are orientated in a first position 138 with respect to axis of rotation 34. Moreover, pads 130, 132, 134 and 136 are configured to orientate to a second position 140 (shown in FIG. 7) about axis of rotation 34. Second position 140 includes pads 130, 132, 134 and 136 orientated in at least one of a 90°, 180° and 270° degree rotation with respect to first position 138. Alternatively, second position 140 can include any angular orientation of pads 130, 132, 134 and 136 with respect to first position 138. Pads 130, 132, 134 and 136 are configured to angularly rotate between first position 138 and second position 140 to facilitate orientating pattern 126 of through-holes 128 with a particular orientation of pump 44 (shown in FIG. 2).

Figure 4:
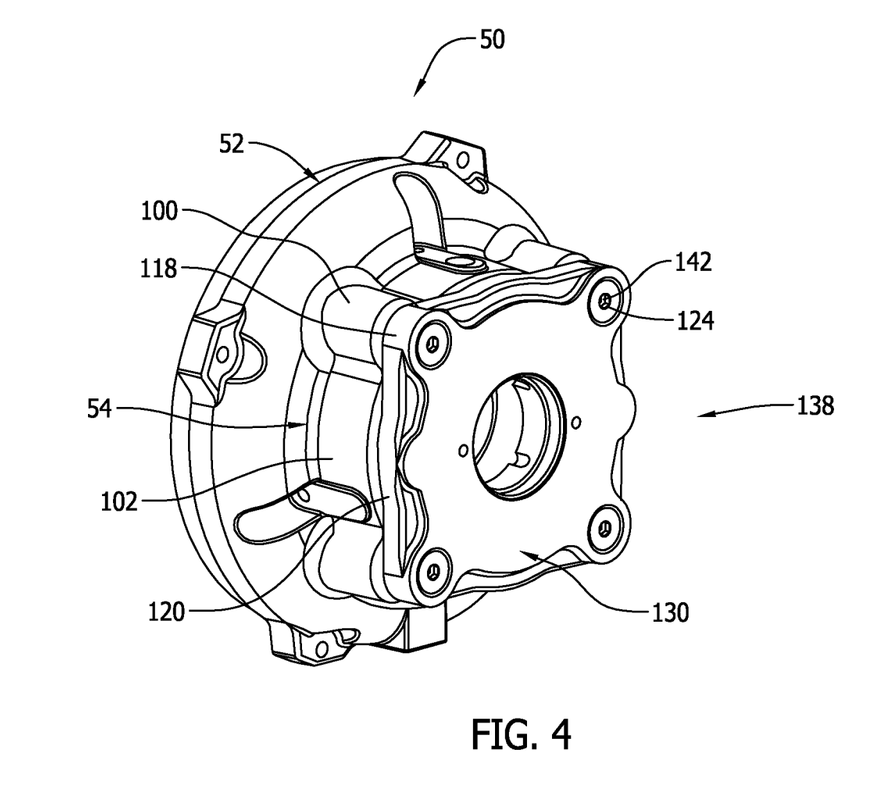
FIG. 4 is a perspective view of the motor component shown in FIG. 3 coupled to one of the pads shown in FIG. 3.

FIG. 4 is a perspective view of motor component 50 coupled to first pad 130. In the exemplary embodiment, pad 130 is in first position 138. More particularly, adapter corners 100 are configured to align with pad corners 118 and adapter sides 102 are configured to couple to pad sides 120. Fasteners 142 such as, for example bolts, are configured to insert through through-holes 108 (shown in FIG. 3) and through-holes 124 to facilitate coupling adapter 54 to pad 130.

Figure 5:
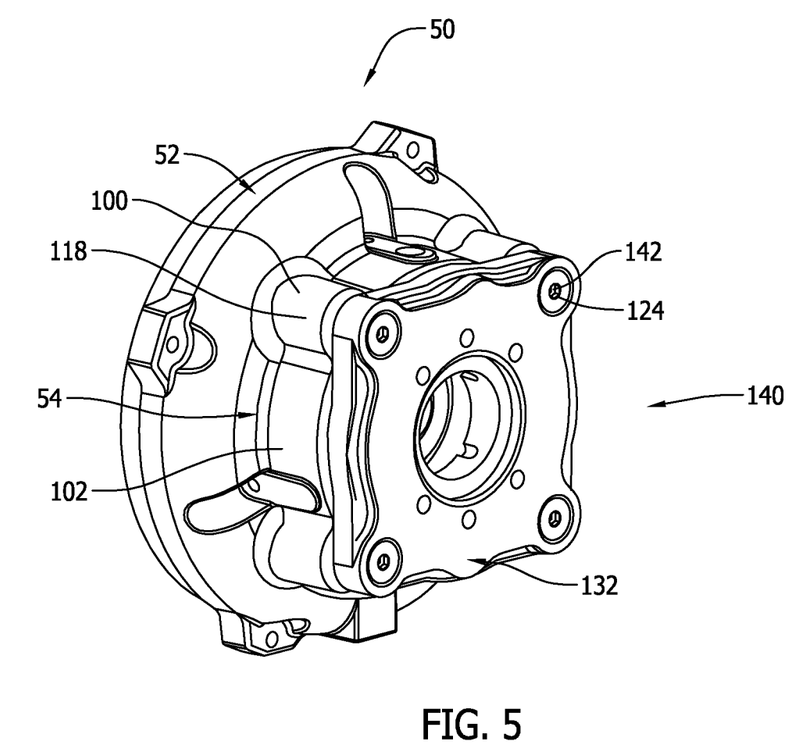
FIG. 5 is a perspective view of the motor component shown in FIG. 3 coupled to one of the pads shown in FIG. 3.

FIG. 5 is a perspective view of motor component 50 coupled to second pad 132. In the exemplary embodiment, pad 132 is in second position 140. More particularly, second position 140 includes pad 132 rotated about 90° with respect to first position 138 (shown in FIG. 3). Adapter corners 100 are configured to align with pad corners 118 and adapter sides 120 are configured to couple to pad sides 102. Fasteners 142 such as, for example bolts, are configured to insert through through-holes 108 (shown in FIG. 3) and through-holes 124 to facilitate coupling adapter 54 to pad 132.

Figure 6:
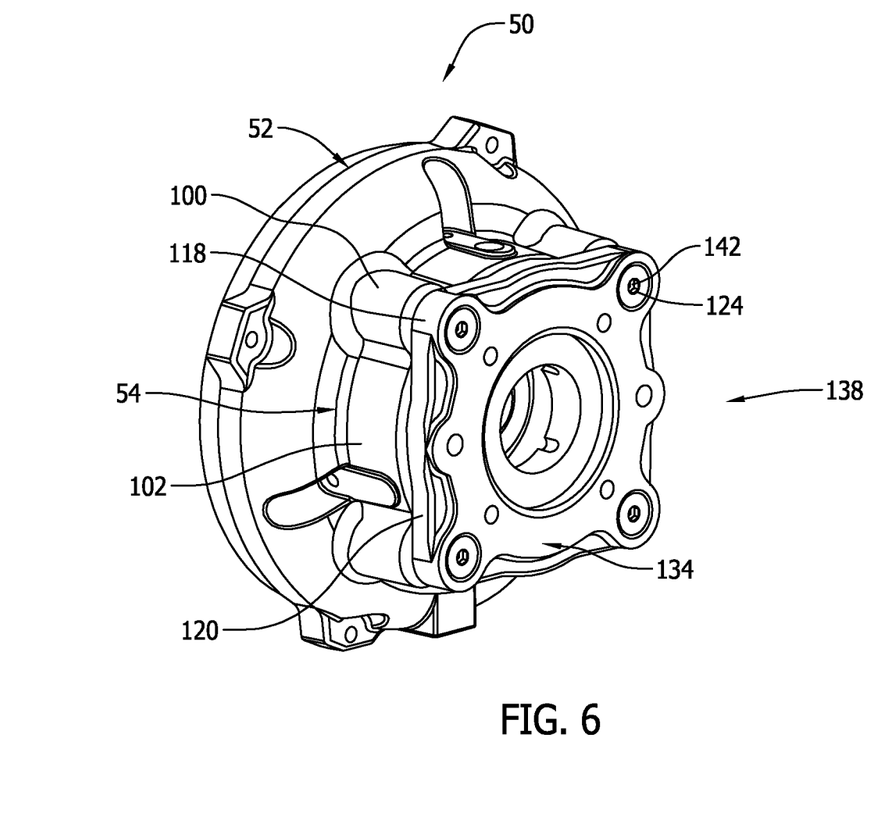
FIG. 6 is a perspective view of the motor component shown in FIG. 3 coupled to one of the pads shown in FIG. 3.

FIG. 6 is a perspective view of motor component 50 coupled to third pad 134. In the exemplary embodiment, pad 134 is in first position 138. More particularly, adapter corners 100 are configured to align with pad corners 118 and adapter sides 102 are configured to couple to pad sides 120. Fasteners 142 such as, for example bolts, are configured to insert through through-holes 108 (shown in FIG. 3) and through-holes 124 to facilitate coupling adapter 54 to pad 134.

Figure 7:
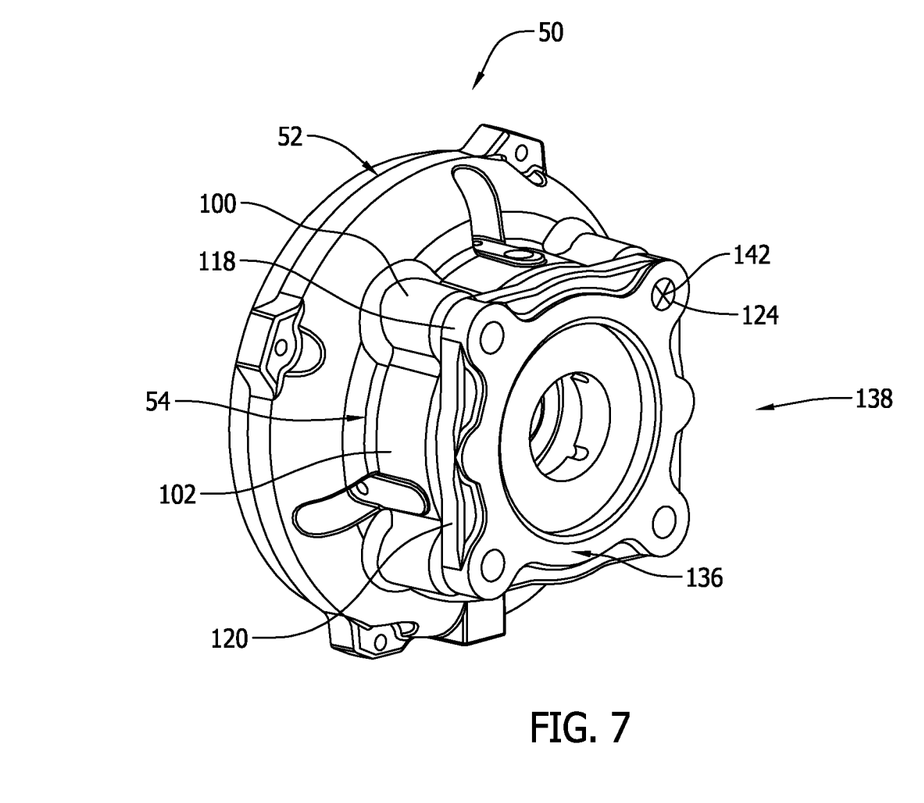
FIG. 7 is a perspective view of the motor component shown in FIG. 3 coupled to one of the pads shown in FIG. 3.

FIG. 7 is a perspective view of motor component 50 coupled to fourth pad 136. In the exemplary embodiment, pad 136 is in first position 138. More particularly, adapter corners 100 are configured to align with pad corners 100 and adapter sides 102 are configured to couple to pad sides 102. Fasteners 142 such as, for example bolts, are configured to insert through through-holes 108 (shown in FIG. 3) and through-holes 124 to facilitate coupling adapter 54 to pad 136.

Figure 8:
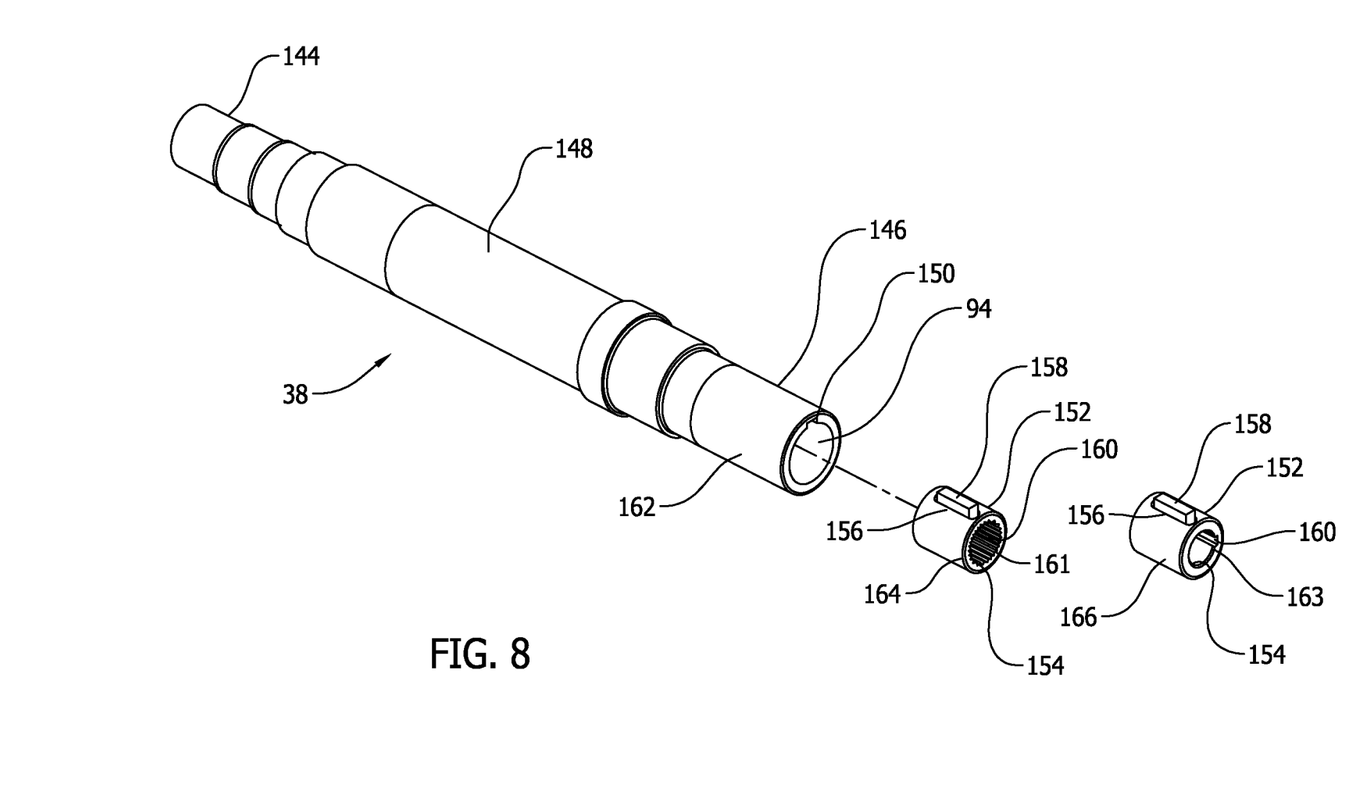
FIG. 8 is a perspective view of an exemplary shaft adapter of the motor component shown in FIG. 3 and a motor shaft of the electric motor shown in FIG. 1.

FIG. 8 is a perspective view of motor shaft 38 and shaft adapter 56. Motor shaft 38 includes a first end 144, a second end 146, and a body 148 extending between first and second ends 144, 146. Second end 146 includes bore 94 having a slot 150 defined within second end 146. In the exemplary embodiment, shaft adapter 56 includes an outer surface 152, an inner surface 154, and a slot 156 disposed through outer and inner surfaces 152, 154. Shaft adapter 56 further includes a key 158 configured to couple to slot 152. Moreover, key 158 is configured to couple to bore slot 150 to facilitate positioning and coupling shaft adapter 56 to second end 146. More particularly, outer surface 154 is configured to insert within bore 94 such that key 158 is configured to couple to bore slot 152.

In the exemplary embodiment, inner surface 156 includes a fastener 160 that is sized and shaped to couple to pump shaft 48 (shown in FIG. 2) to facilitate coupling pump shaft 48 to motor shaft 38. In the exemplary embodiment, fastener 160 includes a splined fastener 161. In another embodiment, fastener 160 includes a keyed fastener 163. Fastener 160 can include any shape and size to facilitate coupling pump shaft 48 to motor shaft 38. Inner surface 156 is sized and shaped to couple to a plurality of different pump shafts 48. In the exemplary embodiment, motor component 50 includes a plurality of shaft adapters 56 having different sizes and shapes to facilitate universal coupling to a plurality of motor shafts 38 and to a plurality of pump shafts 48.

Shaft adapter 56 includes a first material 162, motor shaft 38 includes a second material 164 and pump shaft 48 includes a third material 166. First material 162 includes materials such as, but not limited to, metals, non-metals, plastics, alloys, and composites. Second material 164 includes materials such as, but not limited to, metals, non-metals, plastics, alloys, and composites. Third material 166 includes materials such as, but not limited to, metals, non-metals, plastics, alloys, and composites. First, second and third materials 162, 164 and 166 can include any type of material that enables motor shaft 38, pump shaft 48 and shaft adapter 56 to function as described herein. In the exemplary embodiment, first material 162 includes a different material composition than second material 164 and/or third material 166 to facilitate minimizing and/or eliminating fretting between motor shaft 38 and shaft adapter 56 and/or between motor shaft 38 and pump shaft 48 and/or between pump shaft 48 and shaft adapter 56.

Figure 9:
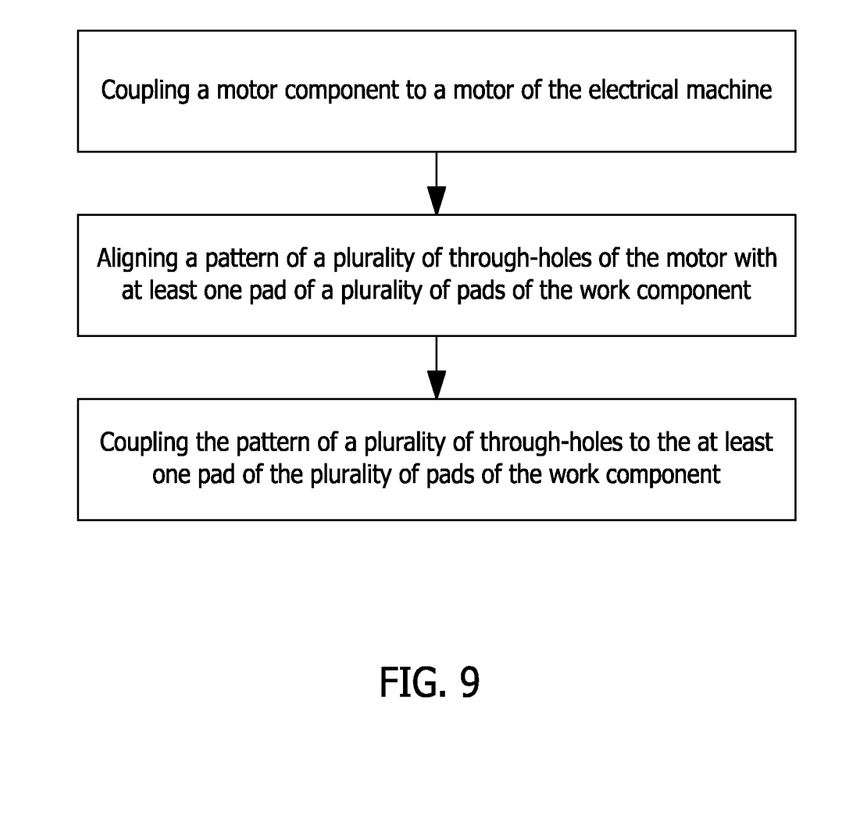
FIG. 9 illustrates an exemplary flowchart illustrating a method of assembling an electric motor to a work component.

FIG. 9 illustrates an exemplary flowchart 900 illustrating a method 902 of assembling an electrical machine, for example motor 10 (shown in FIG. 2), to a work component, for example pump 44 (shown in FIG. 2). The motor includes a motor component having a flange, an adapter and a shaft adapter, such as, for example, motor component 50, flange 52, adapter 54 and shaft adapter 56 (shown in FIG. 2). Method 902 includes coupling 904 the shaft adapter to a motor shaft, for example motor shaft 38 (shown in FIG. 8), of motor.

Method 902 includes coupling 906 the motor component to the motor. Additionally, method 902 includes orientating 908 the adapter toward the pump. A pump shaft, for example pump shaft 48 (shown in FIG. 2), of the pump is inserted 910 through an adapter aperture, such as adapter aperture 98 (shown in FIG. 3), of the adapter. Method 902 includes coupling 912 the shaft adapter to the pump shaft. In one embodiment, method 902 includes coupling a splined shaft adapter to the pump shaft. In another embodiment, method 902 includes coupling a keyed shaft adapter to the pump shaft.

In one embodiment, method 902 includes rotating 914 the pad to at least one of a first position, for example first position 138 (shown in FIG. 3), and a second position, for example second position 140 (shown in FIG. 5). Method 902 further includes aligning 916 a pattern of through-holes, for example pattern 106 of through-holes 108 (shown in FIG. 3), of the adapter with the pad. The pattern of through-holes is coupled 918 to at least one of the pads of the plurality of pads.

A technical effect of the systems and methods described herein includes at least one of: a motor component for coupling a motor to a work component is provided; a flange coupled to the motor; and an adapter coupled to the flange; the adapter includes a shaft aperture and a pattern of a plurality of through-holes disposed about the shaft aperture and configured to couple to a plurality of pads of the work component; and a method of assembling an electrical machine by coupling a motor component of a motor to a plurality of pads of a work component.

The exemplary embodiments described herein facilitate universal coupling of a motor to a plurality of pumps and/or pump shafts having a plurality of shapes and/or sizes. The embodiments described herein facilitate minimizing and/or eliminating multiple bushings and/or couplings between the motor and the pump and decreasing component and/or maintenance costs. Moreover, the embodiments described herein facilitate decreasing the distance between the motor and the pump. The embodiments described herein facilitate interchangeability of the motor and/or the pump to reduce field modification and/or field replacement of the motor and/or pump. Moreover, the embodiments described herein facilitate distribution by providing to distributors and/or end users an inventory of motor components and shaft adapters to facilitate matching to various shapes and sizes of motor and/or pumps.

Exemplary embodiments of an electrical machine and methods for assembling the electrical machine are described above in detail. The size ranges disclosed herein include all the sub-ranges therebetween. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other electrical component applications.

While the embodiments described herein are described with respect to motors in which a stator surrounds a permanent magnet rotor, embodiments are contemplated in which an "inside-out" motor incorporates one or more of the improvements described herein. Inside-out motors refer to motors where a stationary stator is surrounded by a rotating rotor. Further, the embodiments are applicable to any permanent magnet rotating machine.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor component for coupling a motor to a work component, the work component including at least one working component shaft, the motor including at least one motor shaft, said motor component comprising:
    a flange removably coupled to the motor using a fastener, said flange comprising at least one fluid inlet, at least one fluid outlet, and an interior portion, said interior portion configured to accept a bearing therein, said at least one fluid inlet and said at least one fluid outlet coupled in flow communication with the bearing; and
    an adapter integrally formed as a single piece component with said flange, said adapter comprising at least one adapter fluid inlet and at least one adapter fluid outlet, said adapter comprising:
        a shaft adapter configured to couple the at least one working component shaft to the at least one motor shaft;
        a shaft aperture coupled in flow communication with said at least one adapter fluid inlet and said at least one adapter fluid outlet; and
        a pattern of a plurality of through-holes disposed about the shaft aperture and configured to couple to a plurality of pads of the work component.

2. The motor component of claim 1, wherein said shaft adapter is coupled to a bore formed in the motor shaft.

3. The motor component of claim 1, wherein said shaft adapter comprising at least one of a splined fastener and a keyed fastener.

4. The motor component of claim 1, wherein said pattern of said plurality of through-holes is orientated to couple to at least one through-hole of a pad of the plurality of pads.

5. The motor component of claim 1, wherein said adapter comprises a plurality of corners, at least one through-hole of said plurality of through-holes is disposed through a corner of said plurality of corners.

6. The motor component of claim 5, wherein said adapter comprises a plurality of curvilinear sides, each curvilinear side is positioned between a pair of corners of said plurality of corners.

7. The motor component of claim 1, wherein said adapter comprises a adapter aperture configured to receive a motor shaft therethrough.

8. The motor component of claim 1, wherein said adapter comprises a pad adapter aperture that is concentric with and sized different than said shaft aperture.

9. An electrical machine for coupling to a work component, the work component including at least one working component shaft, said electrical machine comprising:
    a motor comprising a stator having a longitudinal axis, a rotor coupled to said stator and a motor shaft coupled to said rotor along the longitudinal axis;
    a housing coupled to and enclosing said motor;
    a flange removably coupled to said housing, said flange comprising at least one fluid inlet, at least one fluid outlet, and an interior portion;
    a bearing disposed within said interior portion, said bearing directly coupled to said flange, said at least one fluid inlet and said at least one fluid outlet coupled in flow communication with said bearing; and
    an adapter integrally formed as a single piece component with said flange, said adapter comprising at least one adapter fluid inlet and at least one adapter fluid outlet, said adapter comprising:
        a shaft aperture coupled to said motor shaft, said shaft aperture coupled in flow communication with said at least one adapter fluid inlet and said at least one adapter fluid outlet;
        a pattern of a plurality of through-holes disposed about the shaft aperture and configured to align with a plurality of pads of the work component; and
        a shaft adapter coupled to said motor shaft and to said adapter, said shaft adapter configured to couple the at least one working component shaft to said motor shaft.

10. The electrical machine of claim 9, wherein said pattern of said plurality of through-holes is configured to couple to a plurality of Society of Automotive Engineers (SAE) designated pads of the work component.

11. The electrical machine of claim 10, wherein said pattern of said plurality of through-holes is configured to couple to at least one of an SAE "A" pump pad, an SAE "B" pump pad, an SAE "C" pump pad and an SAE "D" pump pad.

12. The electrical machine of claim 9, wherein said shaft adapter comprises a splined fastener.

13. The electrical machine of claim 9, wherein said shaft adapter comprises a keyed fastener.

14. The electrical machine of claim 9, wherein said shaft adapter comprises a first material and said motor shaft comprises a second material, said first material comprises a different material composition than said second material.

15. The electrical machine of claim 9, wherein at least one through-hole of said pattern of said plurality of through-holes is configured to couple to at least one through-hole of a pad of the plurality of pads.

* * * * *